US012672636B2

(12) United States Patent
Schneider

(10) Patent No.: US 12,672,636 B2
(45) Date of Patent: Jul. 7, 2026

(54) ANIMAL FEEDERS

(71) Applicant: Schneider Saddlery, LLC, Chagrin Falls, OH (US)

(72) Inventor: Stanley Schneider, Gates Mills, OH (US)

(73) Assignee: SCHNEIDER SADDLERY, LLC, Chagrin Falls, OH (US)

( * ) Notice: Subject to any disclaimer, the term of this patent is extended or adjusted under 35 U.S.C. 154(b) by 0 days.

(21) Appl. No.: 18/893,146

(22) Filed: Sep. 23, 2024

(65) Prior Publication Data

US 2025/0008920 A1    Jan. 9, 2025

Related U.S. Application Data

(63) Continuation of application No. 17/587,123, filed on Jan. 28, 2022, now Pat. No. 12,121,010.

(60) Provisional application No. 63/155,342, filed on Mar. 2, 2021.

(51) Int. Cl.
*A01K 5/00* (2006.01)

(52) U.S. Cl.
CPC .................................... *A01K 5/008* (2013.01)

(58) Field of Classification Search
CPC ..... A47B 96/06; A47B 96/061; A47B 96/063; A47B 96/07; A47B 46/00; A01K 5/00; A01K 5/008; A47H 1/10–16; A47H 2001/021; A47G 25/0685; A47G 25/746; A47F 5/08; A47F 5/10; A47K 10/04
USPC .... 248/251–253, 255, 261, 263; 211/96, 99, 211/168, 116, 118, 88.01
See application file for complete search history.

(56) References Cited

U.S. PATENT DOCUMENTS

| | | | | |
|---|---|---|---|---|
| 109,648 | A | * | 11/1870 | Myers .................... A47K 10/04 211/100 |
| 1,204,612 | A | | 11/1916 | Thieme |
| 1,464,311 | A | * | 8/1923 | Eriksen ................. A47K 10/04 211/124 |
| 1,509,330 | A | | 9/1924 | Wyatt |
| 1,796,344 | A | * | 3/1931 | Pleiss .................... A47K 10/04 248/289.11 |
| 2,126,513 | A | * | 8/1938 | Sterrett ................. A47K 10/04 211/172 |
| 2,460,505 | A | * | 2/1949 | Jahoda .................. A47K 10/04 211/100 |

(Continued)

FOREIGN PATENT DOCUMENTS

| | | | |
|---|---|---|---|
| EP | 3189728 A1 | 7/2017 | |
| KR | 200397897 Y1 | * 10/2005 | ............. A47H 1/142 |

OTHER PUBLICATIONS

English translation of KR 200397897 Y1 (Year: 2005).*

(Continued)

*Primary Examiner* — Peter M Poon
*Assistant Examiner* — Danielle A Clerkley
(74) *Attorney, Agent, or Firm* — Lippes Mathias LLP

(57) ABSTRACT

Disclosed herein are devices and methods for livestock feeding and care. The livestock feeding devices include two horizontal bars adapted to be strung through a hay net, and further include at least two mounting brackets which each include a zigzag channel. One horizontal bar is fixed in place on the mounting brackets, and the other horizontal bar moves in and out of the zigzag channels of the mounting brackets.

12 Claims, 15 Drawing Sheets

(56)     References Cited

U.S. PATENT DOCUMENTS

| | | | | | |
|---|---|---|---|---|---|
| 2,817,889 | A | * | 12/1957 | Kalal .................... | A47H 13/04 |
| | | | | | 24/365 |
| 3,643,811 | A | * | 2/1972 | Howerton ............ | A47B 81/005 |
| | | | | | 211/64 |
| 3,995,742 | A | * | 12/1976 | Austin .................... | A47F 5/08 |
| | | | | | 16/225 |
| 4,006,825 | A | * | 2/1977 | Austin ................. | A47F 7/0035 |
| | | | | | 211/64 |
| 4,127,195 | A | * | 11/1978 | Portnoy ................. | D06F 57/12 |
| | | | | | 211/100 |
| 4,366,908 | A | * | 1/1983 | Anderson .......... | A47G 25/0685 |
| | | | | | 248/224.7 |
| 5,019,126 | A | | 5/1991 | Post | |
| 5,189,985 | A | | 3/1993 | Brady et al. | |
| 8,677,940 | B1 | | 3/2014 | Anderson et al. | |
| 9,289,065 | B1 | * | 3/2016 | Lambertson ........... | A47K 10/04 |
| 9,861,199 | B2 | | 1/2018 | Ferreira et al. | |
| 10,765,247 | B2 | | 9/2020 | Moss et al. | |
| 2015/0122188 | A1 | | 5/2015 | Webster | |
| 2017/0142928 | A1 | | 5/2017 | Rust | |
| 2017/0254012 | A1 | | 9/2017 | Barre et al. | |

OTHER PUBLICATIONS

Annotated figure of U.S. Pat. No. 109,648 (Year: 1870).*
German System—Mammut Raufen https://www.mammut-raufen.com/heuraufen/einzigartige-netzraufe/.
Hay Chix Free Up Feeder.
Hay Hoops Original Collapsible Wall Hay Feeder.
Translated Mammut Raufen German Document https://mammut-raufen.com/heuraaufen/einzigartige-netzraufa/.

\* cited by examiner

100

108

104

102b

102a

104

106

108

410
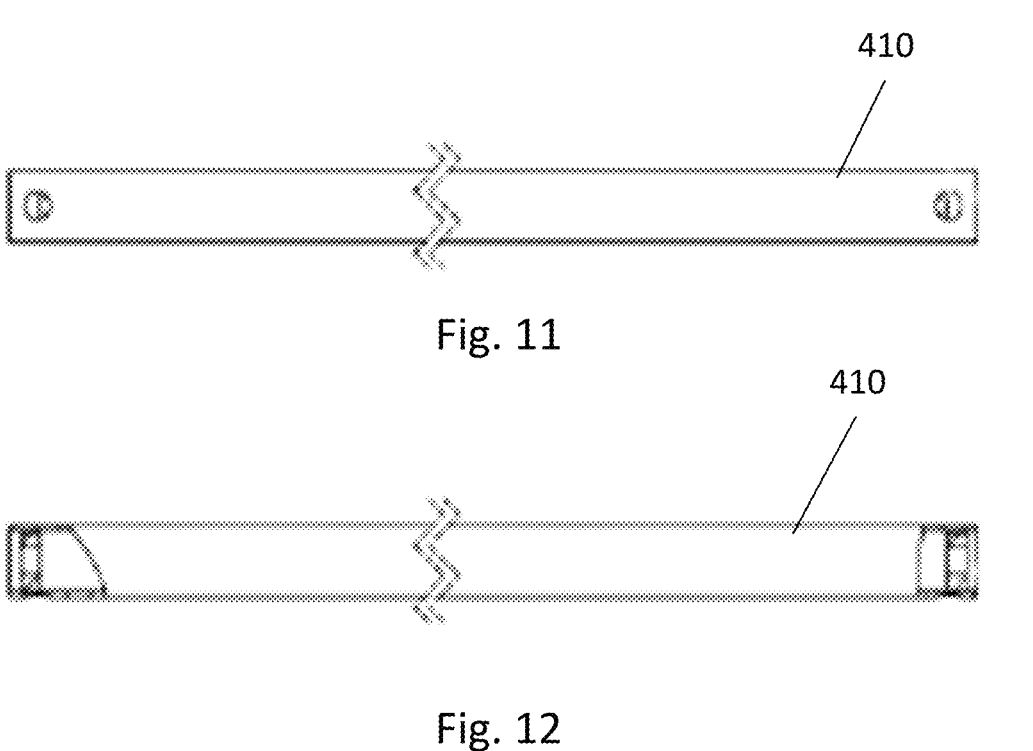
Fig. 11
410
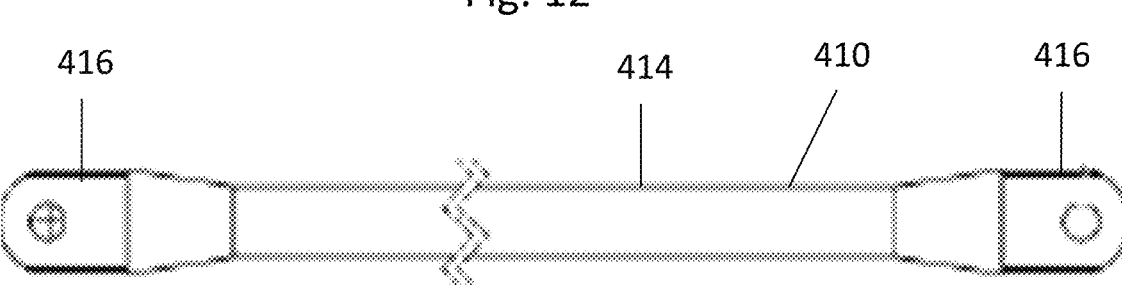
Fig. 12
416      414      410      416
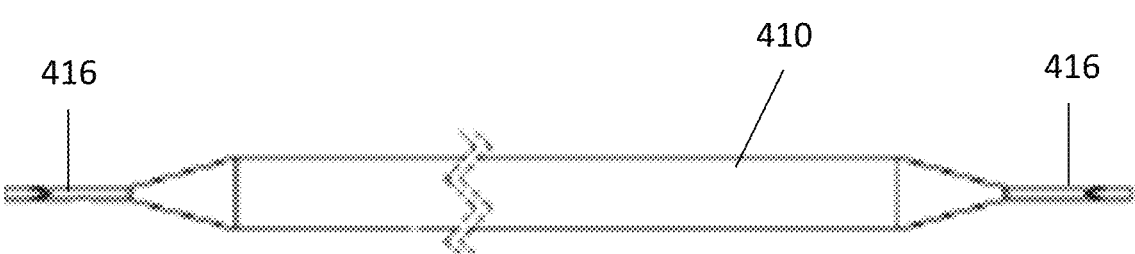
Fig. 13
416      410      416
Fig. 14

602

508

502

508

600

ANIMAL FEEDERS

CROSS-REFERENCE TO RELATED APPLICATIONS

This application is a continuation of U.S. patent application Ser. No. 17/587,123, filed on Jan. 28, 2022, now U.S. Pat. No. 12,121,010, which claims priority to U.S. Provisional Patent Application Ser. No. 63/155,342, filed on Mar. 2, 2021. These applications are each incorporated by reference in their entirety.

BACKGROUND

The present disclosure relates generally to the feeding and care of livestock. More specifically, the present disclosure sets forth devices and a method configured to achieve said feeding and care.

Feeding hay to animals such as livestock has been done for hundreds of years. Using hay nets is among the most popular feeding method and least expensive. However, filling the hay net usually requires two hands to hold open the top of the net, and so a second person is needed for filling the hay net with hay. Additional devices, systems, and/or methods which address this issue would be desirable.

BRIEF DESCRIPTION

The present disclosure is generally directed to methods and devices which allow for an efficient and more simplified manner of feeding animals such as livestock, and more specifically horses. The livestock feeding devices of the present disclosure include at least two horizontal rods that are fed through the holes in a hay net or hay bag. The horizontal rods should be positioned on opposite sides of the top opening of the hay net or hay bag.

The livestock feeding devices of the present disclosure also include at least two mounting brackets which are adapted to be affixed to a vertical surface. The mounting brackets are secured to the vertical surface through means generally known to those in the art. Each mounting bracket has a generally U-shaped channel that is adapted to receive the at least two rods, such that the rods are generally stacked atop one another. The two rods themselves are not (and cannot be) affixed to the vertical surface or to the mounting brackets by any means, and simply sit loosely in each channel. The ends of each rod are enlarged to prevent the rods from sliding horizontally out of the channels. Additionally, once the rods are placed in the channels, a hinged clip secures the top opening of each channel.

The rods are strung through holes in the hay net and then placed in the channels of the mounting brackets. The hay net can be opened by removing one of the rods from the mounting brackets and holding that rod away from the vertical surface with only one hand, with the other rod remaining in the mounting brackets. The operator can then load hay into the opening of the hay net with their other free hand. Once the desired amount of hay is loaded, the removed rod is placed back in the channels of the mounting brackets. The hinged clips close to secure the opening of the channels.

Thus disclosed in various embodiments are kits or devices for a livestock feeding device comprising: two rods, each rod having enlarged ends and adapted to be strung through a hay net; and at least two mounting brackets adapted to be affixed to a vertical surface. Each mounting bracket has a channel adapted to receive the two rods, and a hinged clip for securing the two rods within the channel.

The two rods of the livestock feeding device are loose, i.e. separate parts from the mounting brackets. In further embodiments, the two loose rods may be telescopic rods whose length can change. In other embodiments, the lengths of the two rods is fixed. In particular embodiments, the enlarged ends of the two rods are generally spherical.

The channels of the livestock feeding device are adapted to receive the two rods, and can be of any suitable shape. In particular embodiments, the channels are generally U-shaped. However, other shapes may be used.

The at least two mounting brackets of the livestock feeding device can be affixed to the same vertical surface, or to adjacent vertical surfaces (for example, so the hay bag is in a corner. In such embodiments, for example, the two rods of the livestock feeding device may not be straight, but may be axially bent or curved. In such embodiments, there may be a third bracket, which can be different in shape from the other two mounting brackets, that is configured to receive and support the center portion of the two bent or curved rods.

In some further embodiments, the livestock feeding device may further comprise two vertical rods that are attached to one of the two rods. The two vertical rods are attached to a lower horizontal rod. The lower horizontal rod is received by two lower brackets. This can permit the hay net to be held open without using any hands at all, so the operator can fill the hay net using both hands.

Also disclosed herein are kits/livestock feeding devices comprising: a first upper horizontal rod having enlarged end caps on each end and a second upper horizontal rod, each upper horizontal rod being adapted to be strung through a hay net; at least two upper mounting brackets adapted to be affixed to a vertical surface, each upper mounting bracket having a channel adapted to receive the two upper horizontal rods and a hinged clip for securing the two upper rods within the channel; a lower horizontal rod; a first vertical rod and a second vertical rod, each vertical rod being adapted to attach to the lower horizontal rod and the second upper horizontal rod; and two lower brackets adapted to receive the lower horizontal rod and to be affixed to the vertical surface.

The vertical rods of the livestock feeding device may be attached to each end of the second upper horizontal rod and the lower horizontal rod before the enlarged end caps. The lower horizontal rod passes through an aperture in the two lower brackets. In some embodiments, the apertures of the lower brackets are shaped such that the lower horizontal rod can move vertically within the aperture. The lower horizontal rod can rotate in the aperture between 0 and 180 degrees relative to the vertical surface.

Also disclosed herein are methods for using a livestock feeding device, comprising: receiving a livestock feeding device that comprises: two rods, each rod having enlarged ends and adapted to be strung through a hay net; at least two mounting brackets adapted to be affixed to a vertical surface, each mounting bracket having a channel adapted to receive the at least two rods, and a hinged clip for securing the two rods within the channel; removing one of the rods from the channels of the at least two mounting brackets; holding the removed rod while loading hay into the hay net through a top opening; and placing the removed rod back into the channels of the at least two mounting brackets.

BRIEF DESCRIPTION OF THE DRAWINGS

The following is a brief description of the drawings, which are presented for the purposes of illustrating the exemplary embodiments disclosed herein and not for the purposes of limiting the same.

FIG. 11 is a front view of a vertical rod that can be used with the livestock feeding device of FIG. 7.

FIG. 12 is a side view of the vertical rod of FIG. 11.

FIG. 13 is a front view of another embodiment of a vertical rod that can be used with the livestock feeding device of FIG. 7.

FIG. 14 is a side view of the vertical rod of FIG. 13.

DETAILED DESCRIPTION

Figure 1:
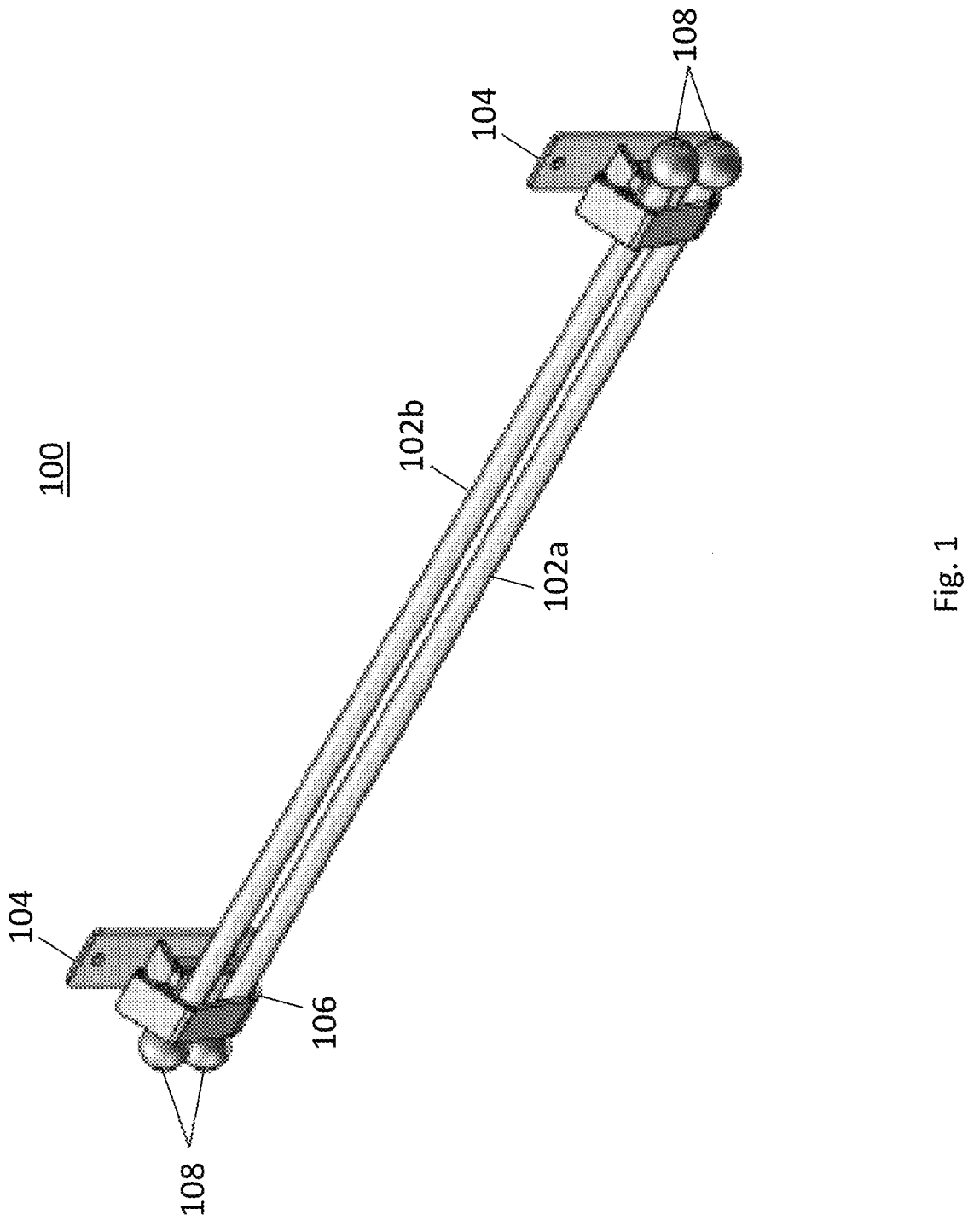
FIG. 1 is a front perspective view of a livestock feeding device in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing kits or devices or methods as "consisting of" and "consisting essentially of" the enumerated components/steps, which allows the presence of only the named components/steps, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The terms "upper" and "lower" are relative to each other in location, i.e. an upper component is located at a higher elevation than a lower component.

The terms "horizontal" and "vertical" are used to indicate direction relative to an absolute reference, i.e. ground level. However, these terms should not be construed to require similarly-described structures to be absolutely parallel or absolutely perpendicular to each other.

The present disclosure is directed to systems or devices for feeding animals such as livestock, and more specifically horses. Referring first to FIG. 1, the livestock feeding device 100 includes a first horizontal rod 102a and a second horizontal rod 102b which are each adapted to be strung through a hay net or hay bag (not shown). The livestock feeding device 100 also includes two mounting brackets 104. Each mounting bracket 104 is configured to receive the horizontal rods 102a, 102b in a U-shaped channel 106.

Each horizontal rod 102a, 102b has two enlarged end caps 108. The enlarged end caps 108 are larger in diameter than the shaft of the rod, and secure the two horizontal rods 102a, 102b within the mounting bracket channel 106, preventing the horizontal rods from sliding horizontally out of the channel 106. The enlarged end caps 108 can be of any suitable shape, for example spherical, elliptical, cylindrical, planar, etc. The enlarged end caps 108 can be made integrally with the rod, or can be made as separate parts that are fastened to each end of the horizontal rod.

In some specific embodiments, the two horizontal rods 102*a*, 102*b* have a diameter of about 0.5 inches. The enlarged end caps 108 have a larger diameter than the shaft of the rods, and in particular embodiments have a diameter of about 1.0 inch. The mounting brackets are similarly sized. The shaft of the rods 102*a*, 102*b* (i.e. without the enlarged end caps) can be of any suitable length, and in particular embodiments has a length of about 24 inches.

Figure 2:
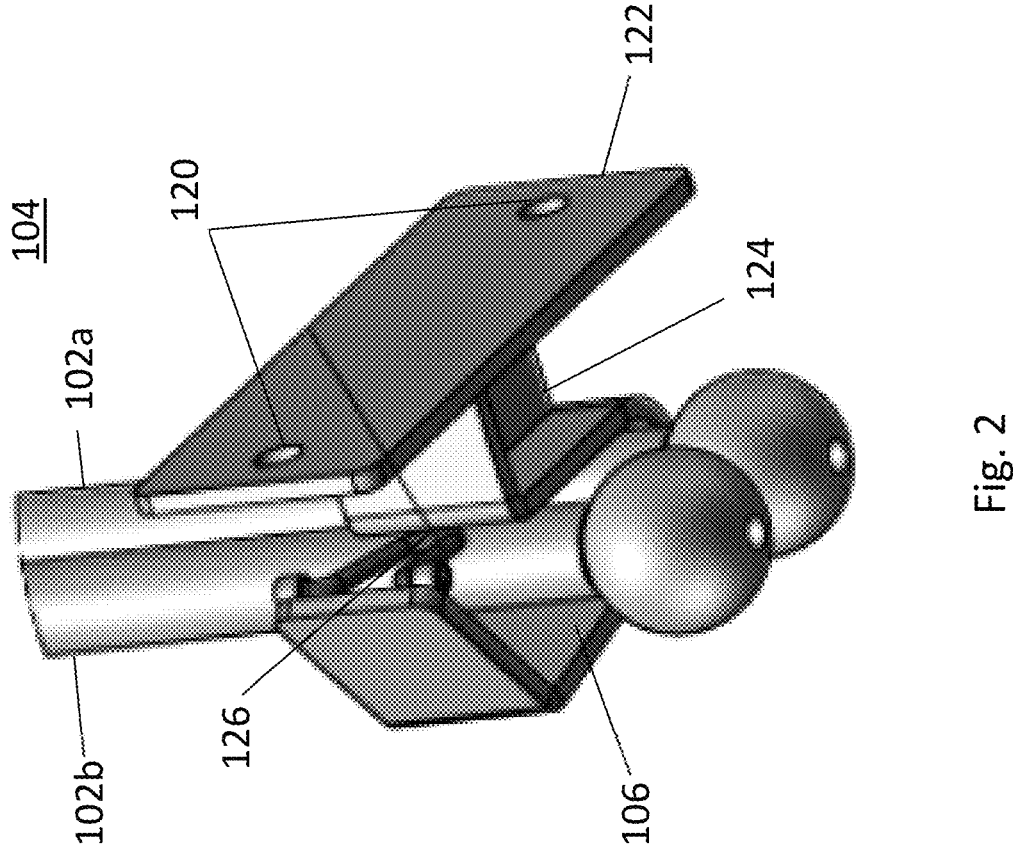
FIG. 2 is a close-up rear perspective view of a mounting bracket with horizontal rods of the livestock feeding device of FIG. 1.

Referring now to FIG. 2, each mounting bracket 104 includes a U-shaped channel 106 which is adapted to receive the horizontal rods 102*a*, 102*b*. The mounting bracket 104 also includes a mounting member 122 which includes apertures 120 for fastening the bracket to a vertical surface, such as a wall of a stable or other similar mountable surface. Optionally, the opening of the channel 106 is closed off or secured by a hinged clip 126. Also visible is an optional stiffener plate 124 joining the channel 106 and the mounting member 122.

Figure 3:
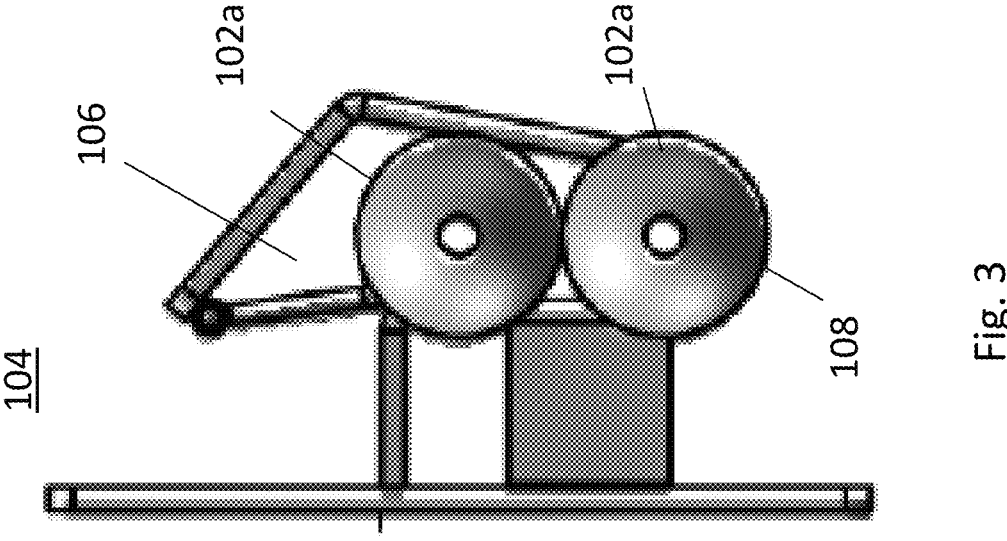
FIG. 3 is a side view of the livestock feeding device of FIG. 1.

FIG. 3 is a side view showing the horizontal rods 102*a*, 102*b* resting in channel 106. As seen here, the horizontal rods 102*a*, 102*b* are stacked vertically (i.e. one on top of the other) within the channel 106. However, it should be appreciated that this is not required. For example, in other embodiments, the rods could rest side-by-side along the bottom of the channel 106, or the rods could be stacked diagonally. Rather, the rods can advantageously be easily removed from the channel 106. In this regard, the horizontal rods 102*a*, 102*b* are not (and cannot be) fastened to the mounting brackets 104 by any fasteners such as screws or nails. The horizontal rods are only held within the channel 106. In addition, it can be seen that the enlarged end caps 108 engage the walls of the channel 106, so the rods cannot fall out of the channel if moved horizontally.

Figures 4, 5, 6:
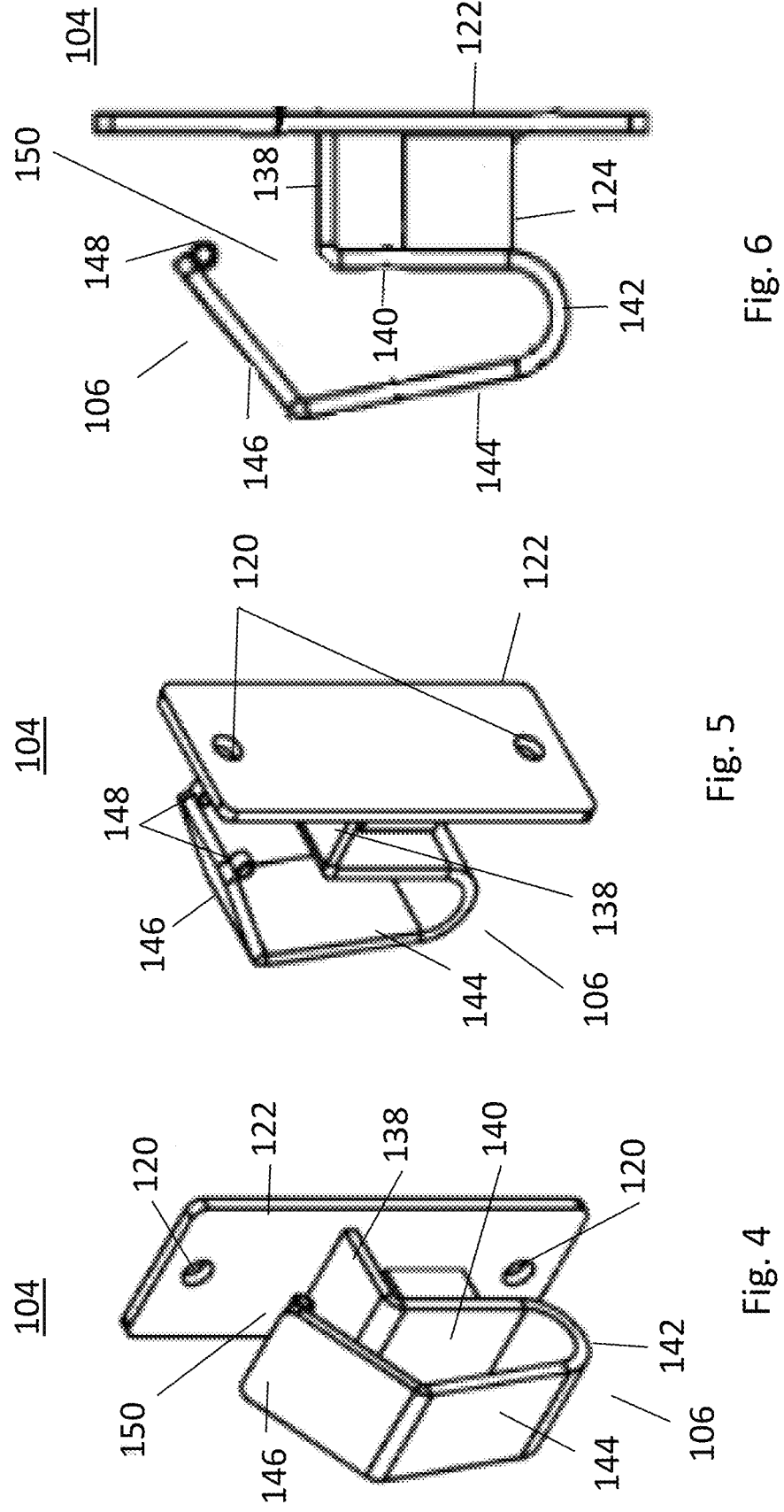
FIG. 4 is a front perspective view of the mounting bracket of FIG. 2.
FIG. 5 is a rear perspective view of the mounting bracket of FIG. 2.
FIG. 6 is a side view of the mounting bracket of FIG. 2, without the horizontal rods present.

FIGS. 4-6 are different views of the mounting bracket 104. FIG. 4 is a front perspective view, FIG. 5 is a rear perspective view, and FIG. 6 is a side view. Referring to FIGS. 4-6 together, the mounting bracket includes a mounting member 122 and a channel 106, which are joined together by a connecting member 138.

The mounting member 122 is oriented vertically, and includes apertures 120. Fasteners such as screws or nails are inserted through the apertures to attach the mounting bracket to a vertical surface such as a wall. The connecting member 138 extends horizontally away from the mounting member to the channel 106.

As illustrated, the channel 106 is comprised of an inner vertical wall 140 and an outer vertical wall 144, which are connected to one another by base 142. As illustrated here, the base is curved, to engage the horizontal rods. An angled wall 146 extends vertically upwards from the top of outer vertical wall 144 and horizontally inwards towards the mounting member. Two clip apertures 148 are present at the free end of the angled wall 146, and are configured to receive the hinged clip 126 (see FIG. 2). The angled wall 146 extends above the connecting member 138. An opening 150 is present, which is large enough to receive the horizontal rods. The channel may be described as U-shaped. However, this particular structure is not required, so long as both horizontal rods can be captured within the channel. For example, the channel may be V-shaped, or box-shaped, etc. Additionally, a stiffener plate 124 may optionally be attached between inner vertical wall 140 and mounting member 122 to stiffen the structure and prevent twisting and separation of the channel 106 from the mounting member 122. In particular embodiments, the various parts of the mounting bracket have a thickness of about 0.1 inches.

In another embodiment of the present disclosure, a livestock feeding device 300 is shown and described with reference to FIGS. 7-14.

Figure 7:
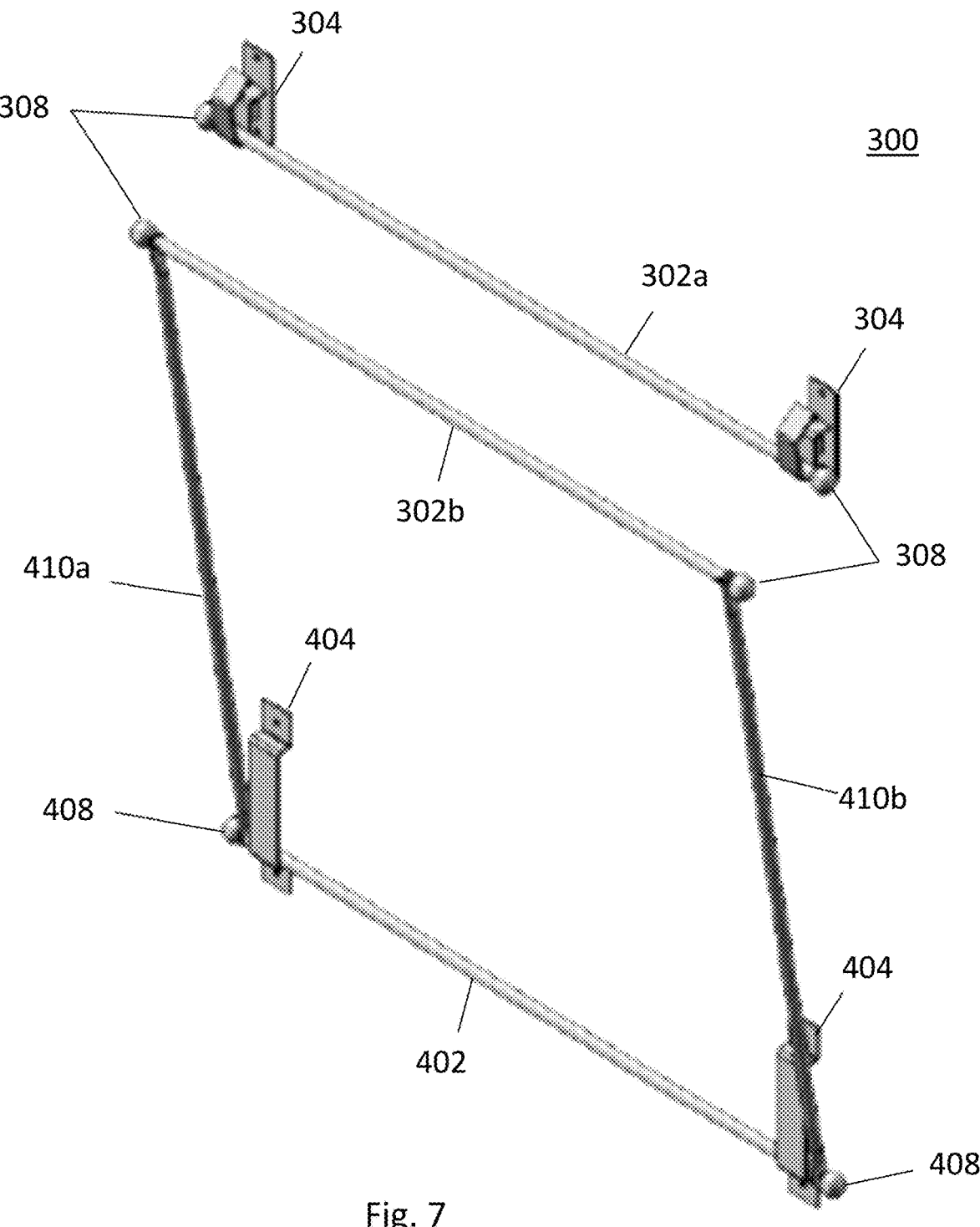
FIG. 7 is a front perspective view of a second embodiment of a livestock feeding device in accordance with the present disclosure

Referring first to FIG. 7, the livestock feeding device 300 includes two upper mounting brackets 304 and first and second upper horizontal rods 302*a*, 302*b*, as previously described. Each upper horizontal rod is illustrated as including enlarged end caps 308.

In addition, the feeding device 300 also includes two lower brackets 404, a lower horizontal rod 402, and two vertical rods 410*a*, 410*b*. Each vertical rod 410*a*, 410*b* is attached at one end to the second upper horizontal rod 302*b* and at the other end to the lower horizontal rod 402. Put another way, the lower horizontal rod 402 is attached to the second upper horizontal rod 302*b* through the vertical rods 410*a*, 410*b*. The lower horizontal rod 402 is also illustrated as having enlarged end caps 408. The lower horizontal rod 402 passes through and rests loosely in hinge brackets 404.

Figure 8:
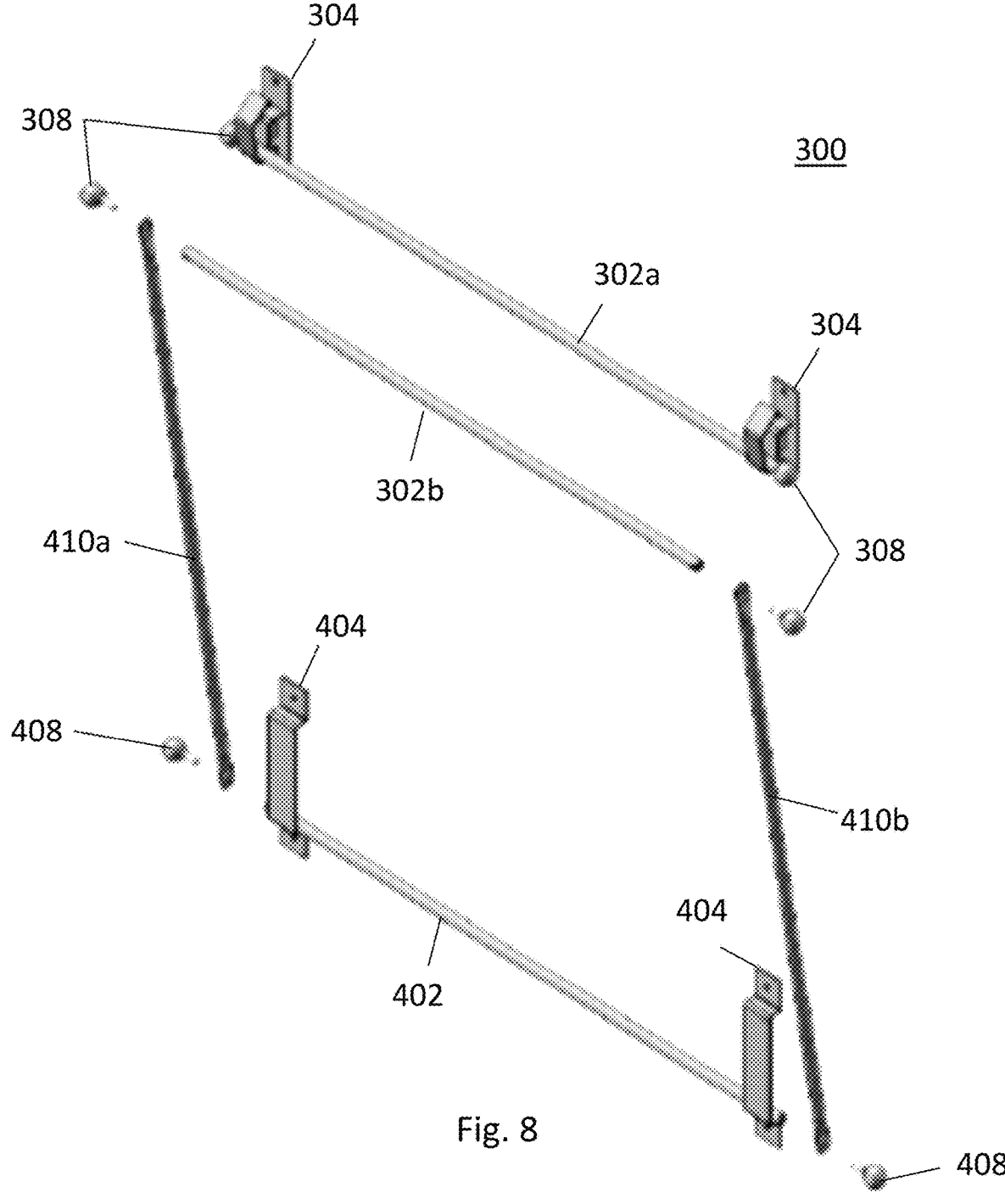
FIG. 8 is an exploded view of the various parts of the livestock feeding device of FIG. 7.

Referring now to FIG. 8, the various parts of the feeding device 300 are shown separately. As seen here, the enlarged end caps 308, 408 can be made separately from the horizontal rods 302*a*, 302*b*, 402. The lower horizontal rod 402 passes through the lower brackets 404. A thread on the enlarged end caps passes through an aperture at each end of the vertical rods 410*a*, 410*b* for attaching the vertical rods to the appropriate horizontal rod. It is noted that only the end caps for first upper horizontal rod 302*a* need to be enlarged to prevent sideways movement out of the mounting brackets 304, as the vertical rods 410*a*, 410*b* will serve that function for the second upper horizontal rod 302*b*.

Figures 9, 10:
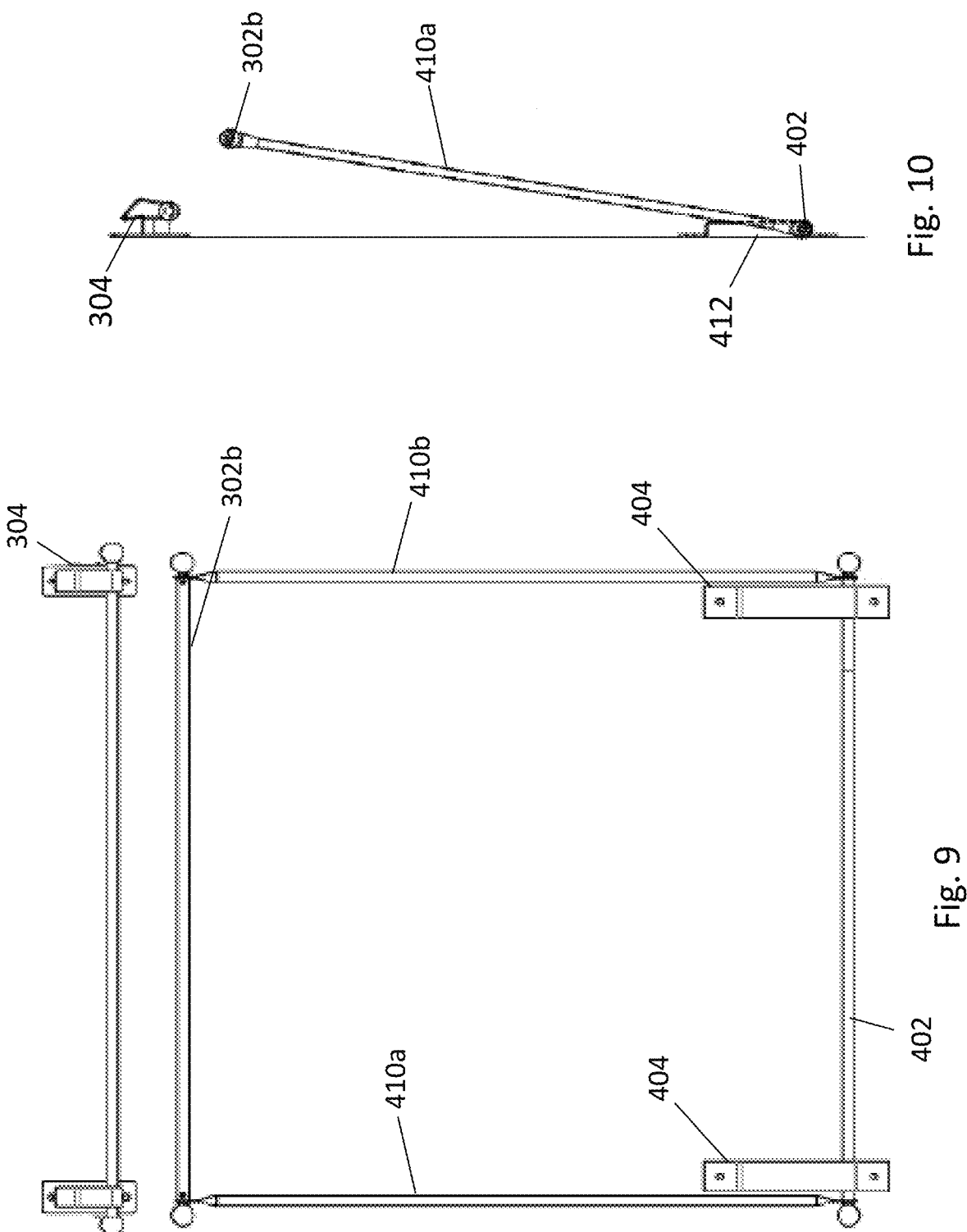
FIG. 9 is a front view of the livestock feeding device of FIG. 7.
FIG. 10 is a side view of the livestock feeding device of FIG. 7.

Referring now to FIG. 9 and FIG. 10, it is noted that as illustrated here, the vertical rods 410*a*, 410*b* are of fixed length. Each lower bracket 404 is shaped to include a vertically oriented elongated aperture 412. This allows the lower horizontal rod 402 to move up and down in the elongated aperture, so the user can move the second upper horizontal rod 302*b* in and out of the upper mounting brackets 304. The lower horizontal rod rotates within the lower brackets 404, and can be rotated from a range of 0 to 180 degrees relative to the vertical surface. When the hay net is present, the assembly holds the hay net open without the need for any hands, so the operator can fill the hay net using both hands.

FIG. 11 and FIG. 12 illustrate one embodiment of a vertical rod 410 that can be used in the assembly of FIG. 9. Briefly, this rod maintains its tubular shape along its entire length.

FIG. 13 and FIG. 14 illustrate another embodiment of a vertical rod 410 that can be used in the assembly of FIG. 9. Briefly, the central portion 414 of this rod has a tubular shape, which tapers down to a flat portion 416 at each end.

Figure 15:
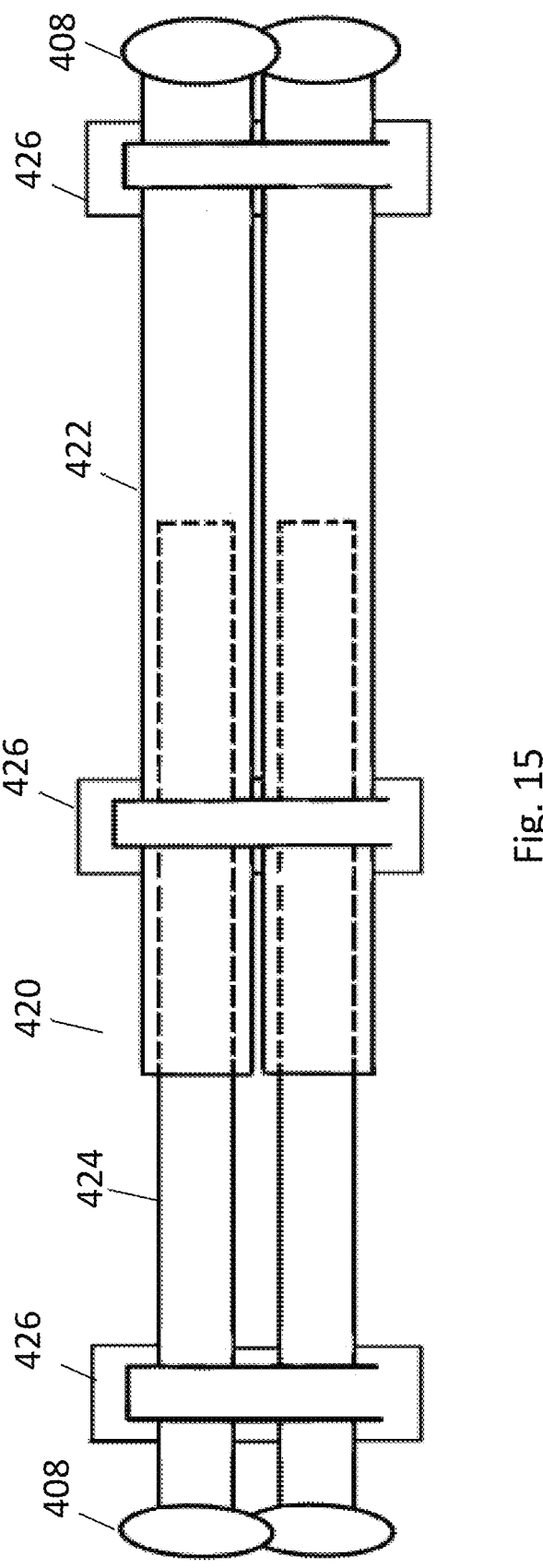
FIG. 15 is a front view of another embodiment of the livestock feeding device, having telescoping horizontal rods and three mounting brackets.

Another embodiment of a livestock feeding device is shown in FIG. 15. Here, the horizontal rods are telescopic, or in other words, the lengths of the horizontal rods are collapsible and/or extendable, or can be varied or changed. Each telescoping horizontal rods 420 is comprised of an outer horizontal rod portion 422 and an inner horizontal rod portion 424. Enlarged end caps 408 are still present at each end of the rod 420. The telescopic rods would permit the livestock feeding device to be used for varying sizes of feeding nets, depending on the needs of the operator. Depending on the length, at least two mounting brackets 426 may be desirably used, and three mounting brackets are illustrated.

Figure 16:
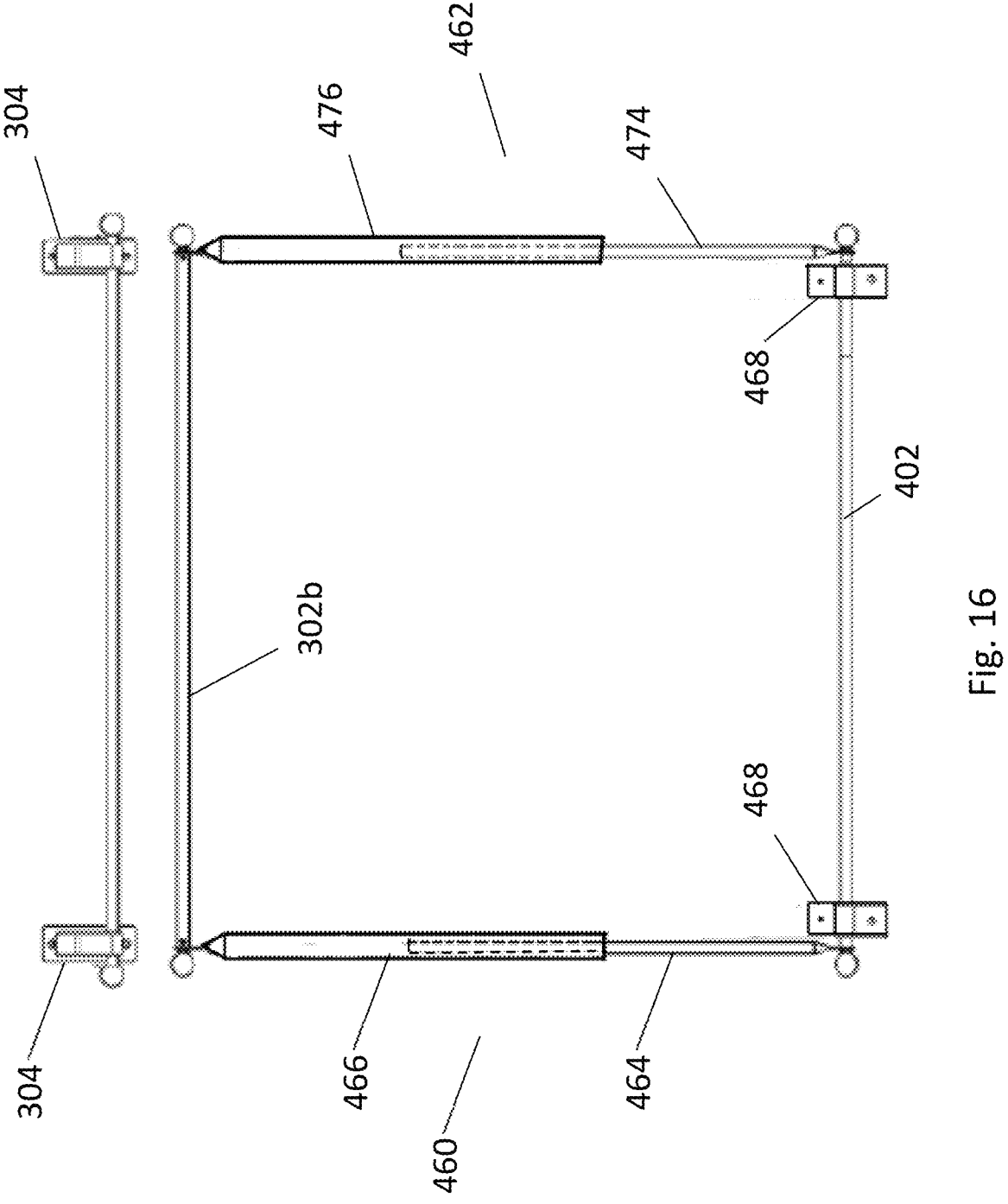
FIG. 16 is a front view of another embodiment of the livestock feeding device of FIG. 11, which uses telescoping vertical rods.

Another embodiment of a livestock feeding device is shown in FIG. 16. Here, the vertical rods are telescopic, such that the individual lengths of the vertical rods are collapsible and/or extendable. Telescopic vertical rods 460, 462 are comprised of inner vertical rod portions 464, 474 and outer vertical rod portions 466, 476. Similar to FIG. 7, the ends of telescopic vertical rods 460, 462 are connected to second upper horizontal rod 302*b* and lower horizontal rod 402. Lower mounting brackets 468 do not have an elongated aperture (compare to brackets 404 of FIG. 7) because the telescopic vertical rods extend to permit movement of the second upper horizontal rod 302*b* in and out of the upper mounting brackets 304.

Figure 18:
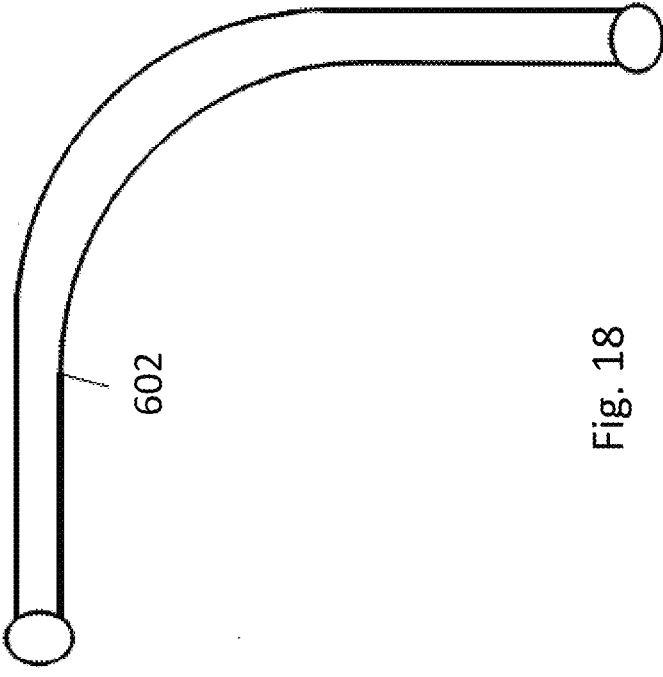
FIG. 18 is a plan view of another embodiment of the livestock feeding device, where the rods are curved.
Figure 17:
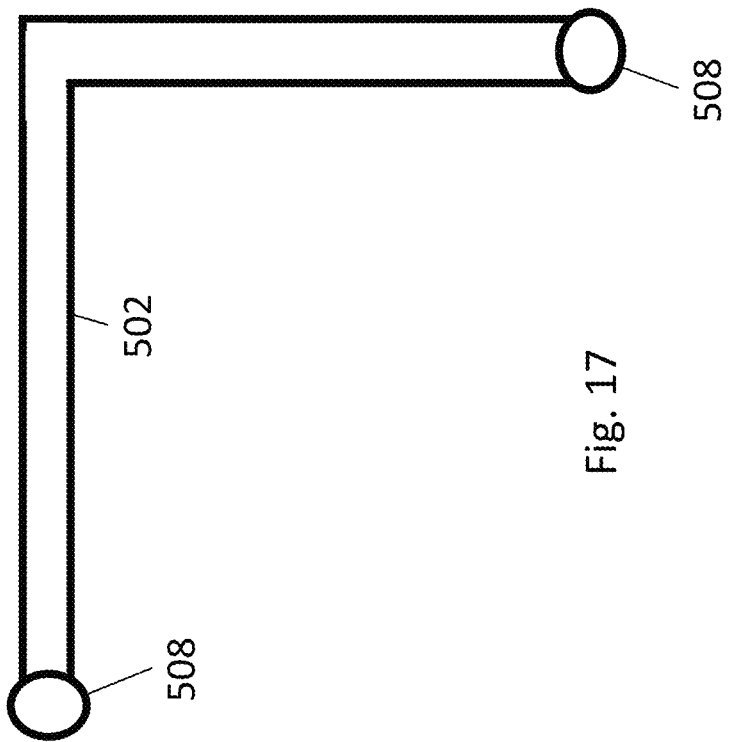
FIG. 17 is a plan view of another embodiment of the livestock feeding device, where the rods are angularly bent.

FIG. 17 and FIG. 18 illustrate other embodiments of horizontal rods that can be used in the assembly of FIG. 1. In FIG. 17, the horizontal rod 502 contains an angular bend, which is about 90°, near the center. Enlarged end caps 508 are still present. In FIG. 18, the horizontal rod 602 is curved. Enlarged end caps 608 are still present. It is contemplated that these rods might be used to place the hay net in the corner of a stall. For example, the mounting brackets would be placed on adjacent (but different) walls that meet in the corner, and these rods would be used to support the hay net or hay bag.

Figure 19:
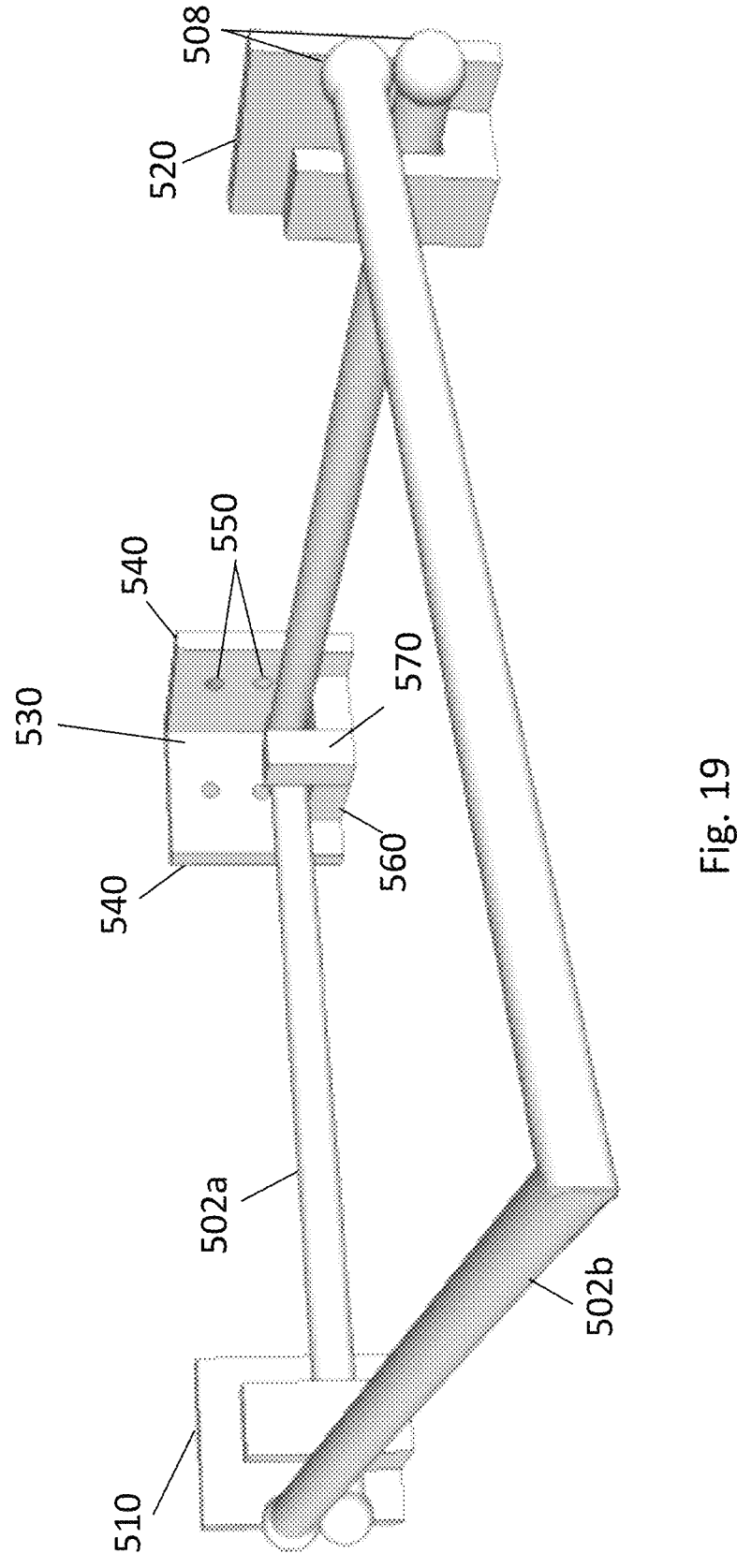
FIG. 19 is a front perspective view of another embodiment of the livestock feeding device of FIG. 17, which includes a third or corner mounting bracket.

FIG. 19 is a front perspective view of a system that includes a third or tertiary mounting bracket 530 that can be used with the embodiments of horizontal rods 502 and 602 as illustrated in FIG. 17 and FIG. 18. This tertiary mounting bracket 530 is located between the first and second mounting brackets 510, 520 (see FIGS. 4-6), and is intended to be placed in the corner of the two adjacent walls. The third mounting bracket 530 is comprised of two mounting members 540 that are oriented vertically. A horizontal support member 560 extends horizontally between the mounting members 540, upon which the bent or curved rods can rest. The two rods are not affixed to the horizontal support member 560. The two mounting members 540 also include apertures 550, which can be located above and/or below the horizontal support member. Fasteners such as screws or nails are inserted through the apertures to attach the third mounting bracket 530 to the adjacent walls. The third mounting bracket 530, in contrast to the other two mounting brackets illustrated in FIGS. 4-6, does not need to include a channel in which the rods rest. For example, as illustrated here, a simple vertical member 570 located along the horizontal support member could be sufficient to maintain the bent rods 502*a*, 502*b*.

Still referring to FIG. 19, the central portion or apex of the bent or curved rods rest on top of the support member 530 when the livestock feeding device is ready for use by an animal such as a horse. In some embodiments, one of the curved or bent rods can rotate in the first and second mounting brackets so as to form a generally square or circular opening at the top of the hay net. The opening allows an operator to load hay into the livestock feeding device. Once the desired amount of hay is loaded, an operator can rotate the curved or bent rod back in place to close the hay net. It is contemplated that jointed rods could be used in such embodiments. In other embodiments, one of the curved or bent rods is removed from the first and second mounting brackets, then rotated 180 degrees and placed back into the first and second mounting brackets to open the hay net. After the hay is loaded, the rod is again removed from the first and second mounting brackets, rotated back to its original position, and then placed back into the hay net. FIG. 19 is illustrated with the bent rods 502*a*, 502*b* in the open position and forming a square opening. Rod 502*b* has been removed, then rotated.

Figure 20:
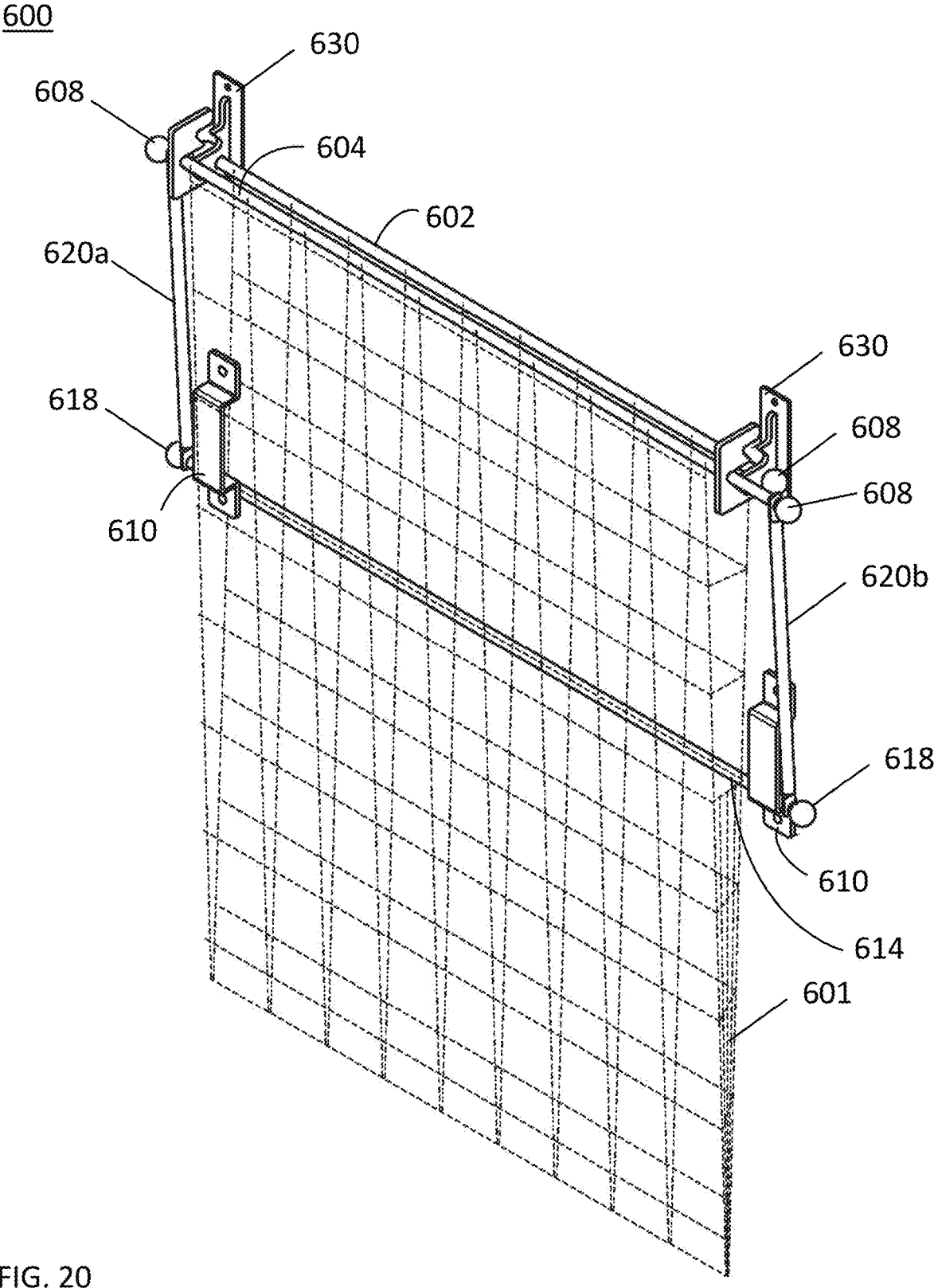
FIG. 20 is a perspective view of another embodiment of a livestock feeding device, with the device in a closed position
Figure 21:
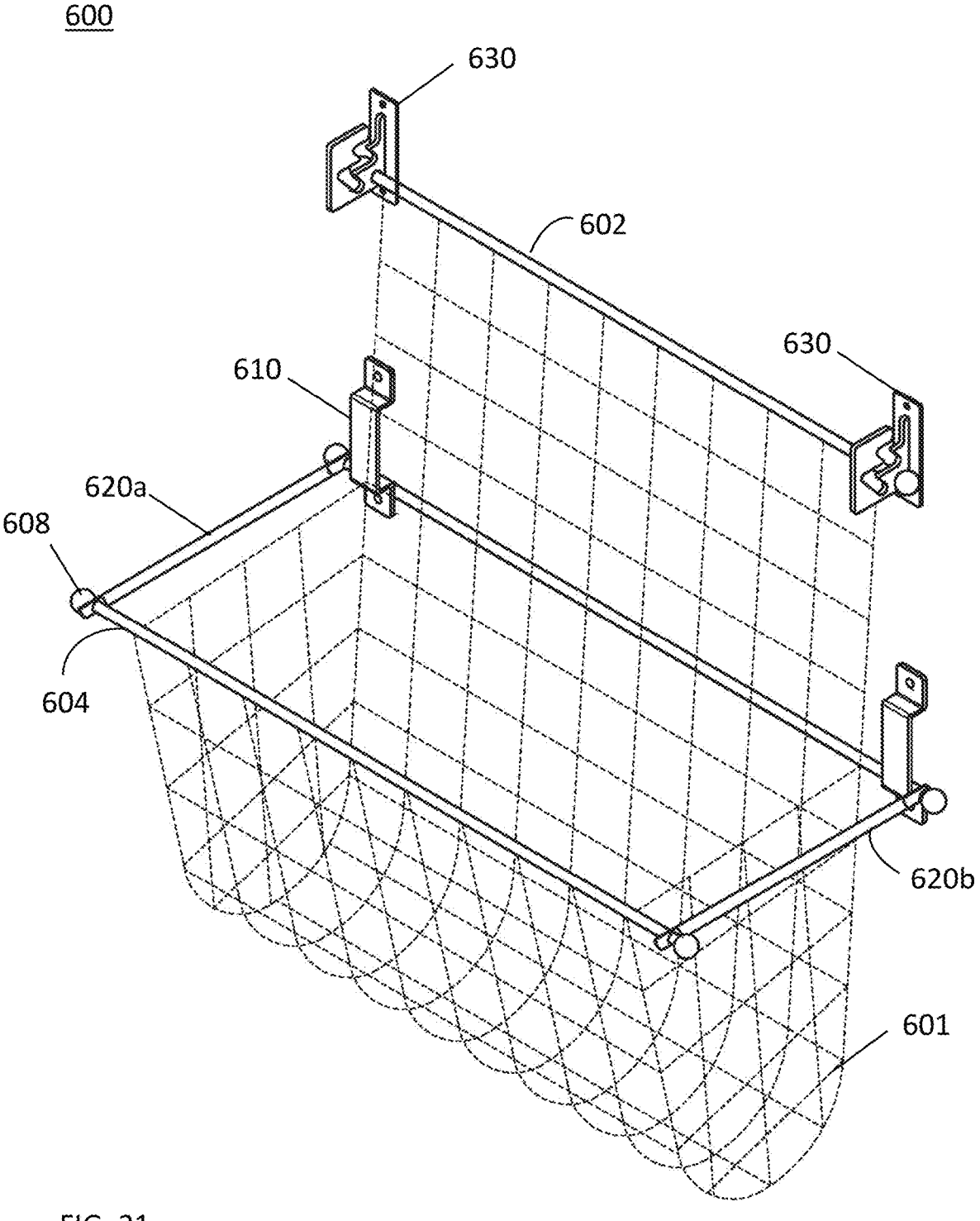
FIG. 21 is a perspective view with the device of FIG. 20 in an open position.
Figures 22, 23:
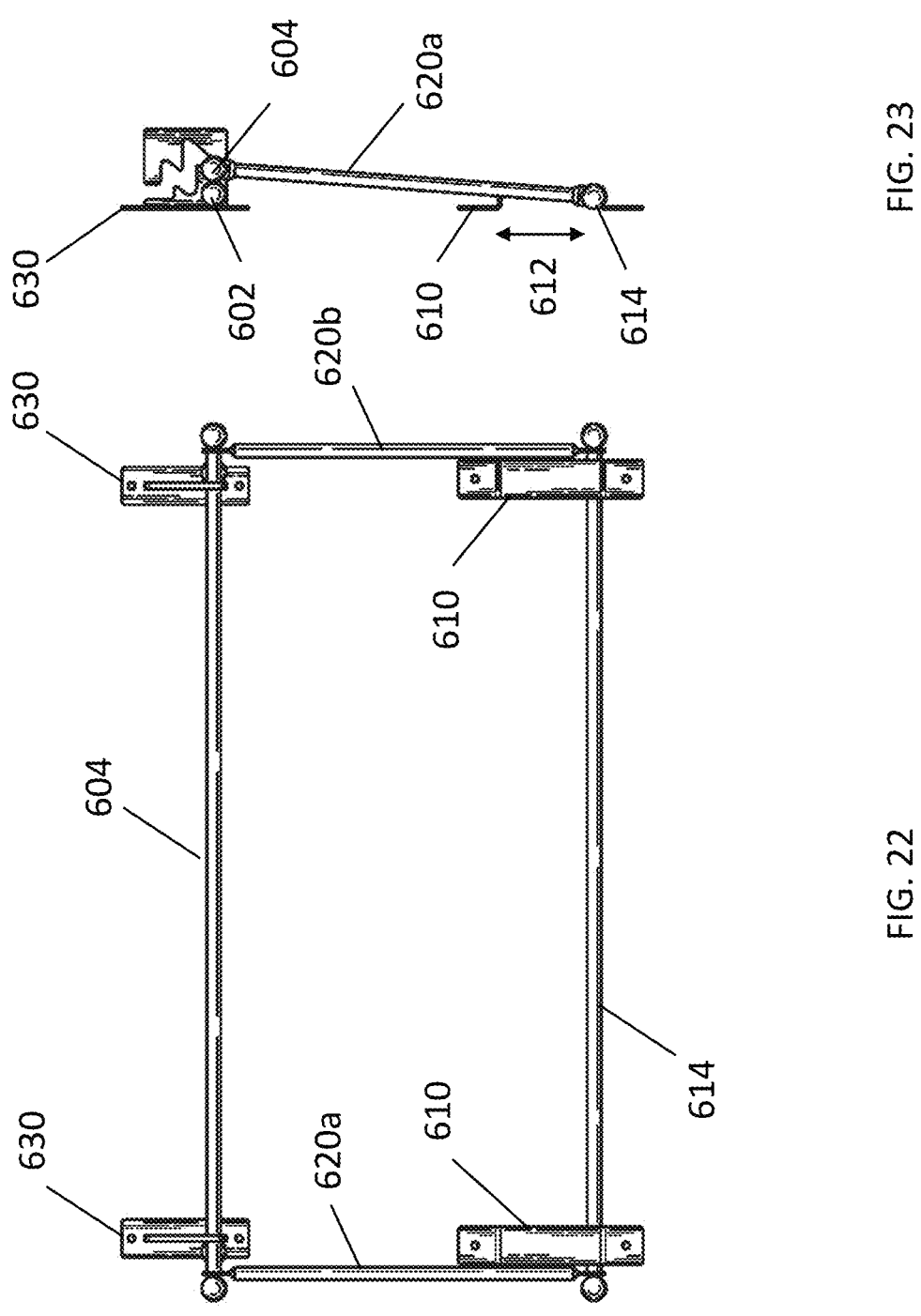
FIG. 22 is a front view of the device of FIG. 20.
FIG. 23 is a side view of the device of FIG. 20.
Figure 24:
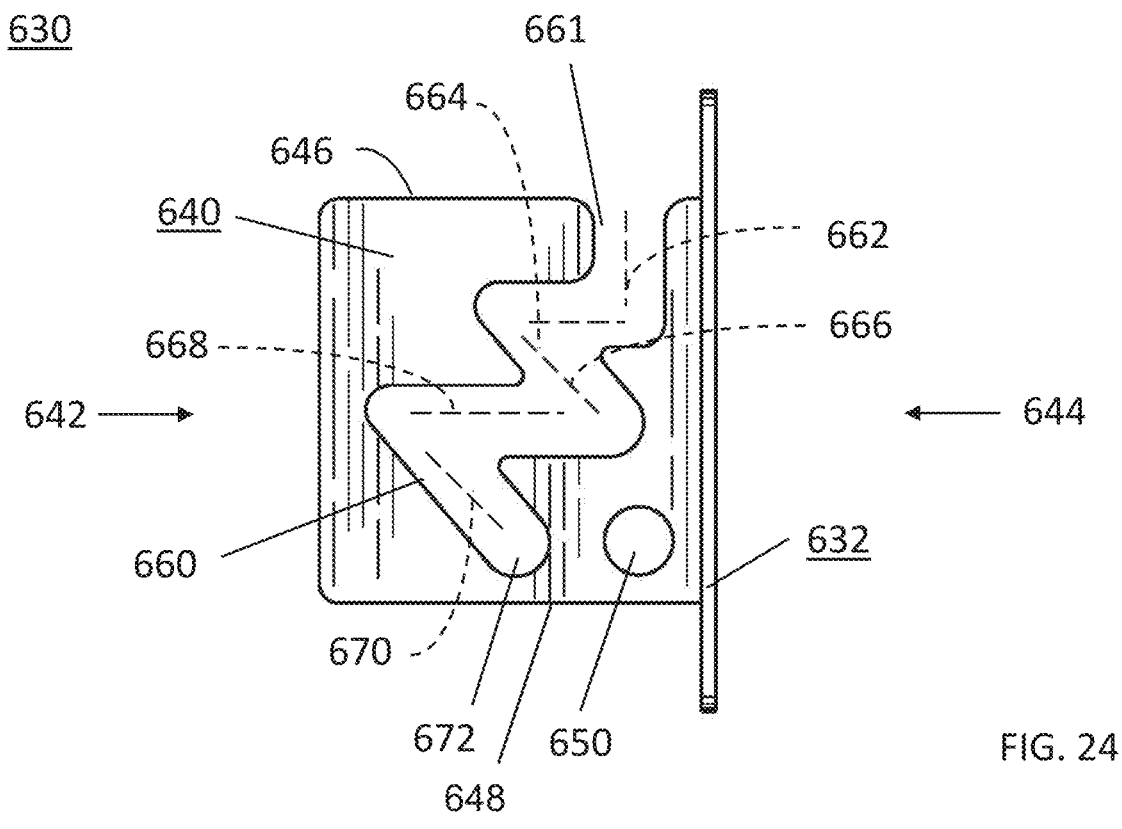
FIG. 24 is a side view of the upper mounting bracket of the device of FIG. 20, having a zigzag channel.
Figure 25:
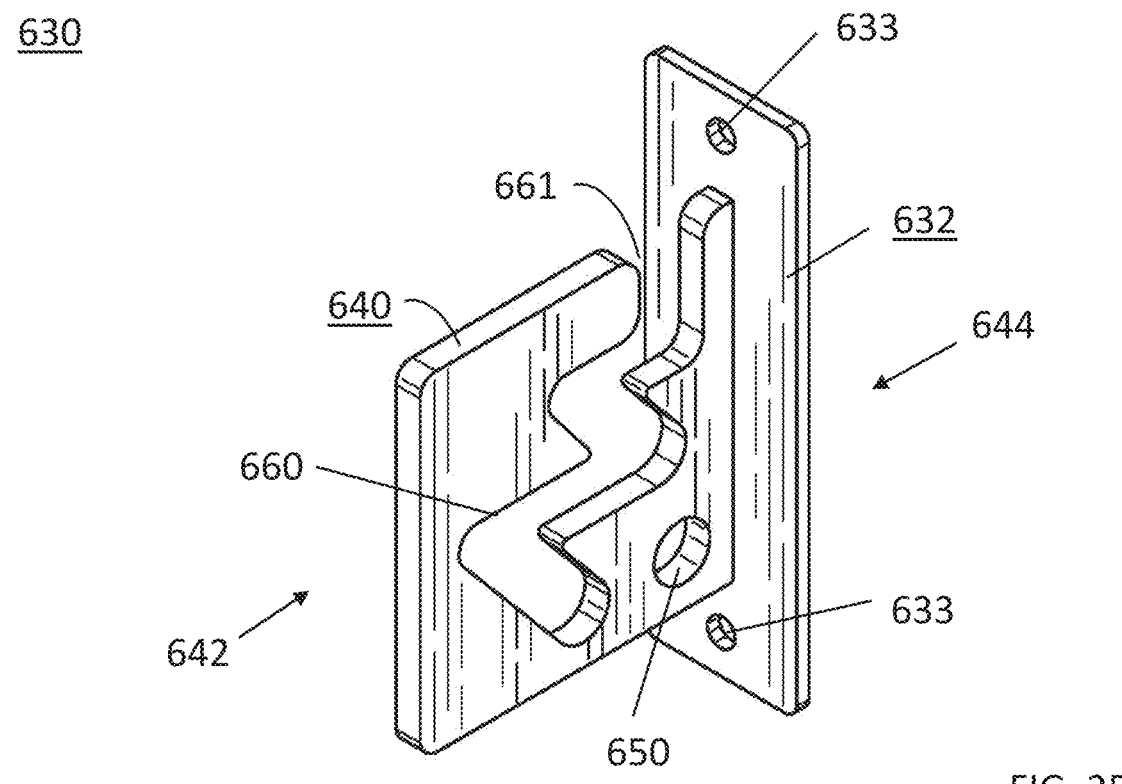
FIG. 25 is a perspective view of the upper mounting bracket of FIG. 24.

FIGS. 20-25 illustrate another embodiment of a livestock feeding device 600. FIG. 20 is a perspective view with the device in a closed position, and FIG. 21 is a perspective view with the device in an open position. FIG. 22 is a front view of the device, and FIG. 23 is a side view of the device. FIG. 24 is a side view of the upper mounting bracket 630 of the device, and FIG. 25 is a perspective view of the upper mounting bracket.

Referring first to FIG. 20 and FIG. 21, the livestock feeding device 600 includes two upper mounting brackets 630, a fixed upper horizontal rod 602, and a mobile upper horizontal rod 604. Each upper horizontal rod is illustrated as including end caps 608. The feeding device 600 also includes two lower brackets 610, a lower horizontal rod 614, and two vertical rods 620*a*, 620*b*. Each vertical rod 620*a*, 620*b* is attached at one end to the mobile upper horizontal rod 604 and at the other end to the lower horizontal rod 614. Put another way, the lower horizontal rod 614 is attached to the mobile upper horizontal rod 604 through the vertical rods 620*a*, 620*b*. The lower horizontal rod 614 is also illustrated as having end caps 618. The lower horizontal rod 614 passes through and rests loosely in the lower brackets 610. A hay bag 601 is also illustrated, which is strung upon the fixed upper horizontal rod 602 and the mobile upper horizontal rod 604, and potentially along the two vertical rods 620*a*, 620*b* as well Similar to the other devices previously described, the enlarged end caps 608, 618 can be made separately from the horizontal rods 602, 604, 614. The horizontal rods are joined to an end cap through an aperture at each end of the vertical rods 620*a*, 620*b* for attaching the vertical rods to the appropriate horizontal rod.

Referring now to FIG. 22 and FIG. 23, as illustrated here, the vertical rods 620*a*, 620*b* are of fixed length. Each lower bracket 610 is shaped to include a vertically oriented elongated aperture 612. This allows the lower horizontal rod 614 to move up and down in the elongated aperture, so the user can move the mobile upper horizontal rod 604 in and out of the upper mounting brackets 630. The lower horizontal rod rotates within the lower brackets 610, and can be rotated from a range of 0 to 180 degrees relative to the vertical surface. When the hay net is present, the assembly holds the hay net open without the need for any hands, so the operator can fill the hay net using both hands.

Referring now to FIG. 24 and FIG. 25, the structure of the upper mounting bracket 630 is shown. The upper mounting bracket 630 includes a mounting member 632 which includes apertures 633 for fastening the bracket to a vertical surface, such as a wall of a stable or other similar surface. A rod engagement member 640 extends in a forward direction normal to the mounting member 632. The rod engagement member has a front end 642 and a rear end 644. The rear end 644 of the rod engagement member engages the mounting member 632. This rod engagement member can be considered a solid piece into which two openings, a rod aperture 650 and a zigzag channel 660, are cut. The rod aperture 650 is present in a lower rear location of the rod engagement member, proximate the mounting member.

The zigzag channel 660 includes an opening 661 on the upper surface 646 of the rod engagement member proximate the rear end 644 of the rod engagement member. As illustrated in FIG. 24, the zigzag channel 660 can be considered as being made up of a vertical channel 662, a first horizontal channel 664, a first diagonal channel 666, a second horizontal channel 668, and a second diagonal channel 670, which are joined sequentially to each other. In some embodiments, the second horizontal channel 668 is longer than the first horizontal channel 664.

Both of the diagonal channels 666, 670 move downwards from the front end 642 toward the rear end 644 of the rod engagement member. The bottom end 672 of the zigzag channel is located forward of the rod aperture 650. The bottom end 672 is also closer to the front end 642 of the rod engagement member than the rod aperture 650 and the opening 661. The bottom end 672 is also proximate the lowermost surface 648 of the rod engagement member. The mobile upper horizontal rod can travel continuously from the opening 661 to the bottom end 672. The diagonal channels 666, 670 are arranged so that the horizontal rod within the zigzag channel must move forward and backwards as the horizontal rod moves up and out of the channel. This increases the difficulty for an animal to remove the horizontal rod itself, while still keeping it relatively easy for a human user to do so using only one hand. This also removes the need to use a locking clip at the opening 661 to close off the opening and keep the horizontal rod within the zigzag channel. It is possible for a horse that is wearing a halter to engage the locking clip and be unable to disengage itself from the locking clip, which can result in the horse causing injury to itself.

In use, referring back to FIG. 20 and FIG. 21, the hay net is strung upon the fixed upper horizontal rod 602, which passes through the rod apertures of the two upper mounting brackets 630 and is then fixed in place using the end caps 608 and joins the mounting brackets together. Similarly, the hay net is strung upon the mobile upper horizontal rod 604, then the two vertical rods 620a, 620b and end caps 608 are attached.

Referring now to FIG. 22, in some embodiments, the mobile upper horizontal rod 604 and the lower horizontal rod 614 are longer than the fixed upper horizontal rod 602. The alternative embodiments described in FIG. 15 and FIG. 16, where the lengths of the horizontal rods and/or the vertical rods can be changed, also apply to the system of FIGS. 20-25. Referring to FIG. 24, the zigzag channel 660 is illustrated as descending to the same depth as the rod aperture 650, but this is not required. In addition, it is contemplated that only the vertical channel, the first horizontal channel, and the first diagonal channel are required for the zigzag channel to move horizontally and vertically. A third horizontal channel could also be added if desired.

The various rods and mounting brackets can be made of any suitable material. For example, they can be made of steel, aluminum, plastic, etc. They can be shaped using conventional manufacturing processes.

Methods for loading the livestock feeding device 100 are also contemplated. For the devices of FIGS. 1-19, the mounting brackets are installed on a vertical wall, and the horizontal rods are strung through a hay net. One of the horizontal rods remains within the channels of the mounting brackets, and the operator holds the other horizontal rod to open the hay net. With their free hand, the operator loads the hay net. Once the hay net is filled with the desired amount of hay or hay flakes, the second horizontal rod is placed back into the channel on the mounting bracket. The hinged clip 126 then secures the opening of the channel, and the livestock feeding device is ready for use by livestock animals such as a horse. The devices of FIGS. 20-25 are similarly operated, except the fixed upper horizontal rod remains fixed in place through the rod apertures of the two upper mounting brackets, and no hinged clip is present at the opening of the zigzag channel.

To aid the Patent Office and any readers of this application and any resulting patent in interpreting the claims appended hereto, it is not intended for any of the appended claims or claim elements to invoke 35 U.S.C. § 112(f) unless the words "means for" or "step for" are explicitly used in the particular claim.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A kit for a livestock feeding device, comprising:
   a first horizontal rod and a second horizontal rod, each horizontal rod having end caps that are larger in diameter than a shaft of the rod;
   at least two mounting brackets adapted to be affixed to an associated vertical surface, each mounting bracket comprising:
   a mounting member;
   a U-shaped channel having an opening and adapted to receive the shaft of both the first horizontal rod and the second horizontal rod, the channel comprising an inner vertical wall and an outer vertical wall connected to each other by a base, and an angled wall extending vertically upwards from a top of the outer vertical wall and horizontally inwards towards the mounting member;
   a hinged clip configured to close off the opening of the U-shaped channel;
   a connecting member joining the U-shaped channel and the mounting member together; and
   a stiffener plate underneath the connecting member joining the inner vertical wall of the U-shaped channel and the mounting member.

2. The kit of claim 1, wherein the mounting member includes apertures for fastening the mounting bracket to the associated vertical surface.

3. The kit of claim 1, wherein the end caps are shaped to be at least one of spherical, elliptical, cylindrical, and planar.

4. The kit of claim 1, wherein the U-shaped channel is shaped such that the first and second horizontal rods are stacked at least one of vertically, side-by-side, and diagonally when placed within the U-shaped channel.

5. The kit of claim 1, wherein the end caps of the first and second horizontal rods are configured to engage walls of the U-shaped channel such that the first and second horizontal rods do not fall out of the channel if moved horizontally.

6. A kit for a livestock feeding device, comprising:
   a first horizontal rod and a second horizontal rod, each horizontal rod having end caps that are larger in diameter than a shaft of the rod;
   at least two mounting brackets adapted to be affixed to an associated vertical surface, each mounting bracket comprising:
   a U-shaped channel having an opening and adapted to receive both the first horizontal rod and the second horizontal rod;
   a mounting member;
   a connecting member joining the U-shaped channel and the mounting member together; and
   a stiffener plate underneath the connecting member joining the U-shaped channel and the mounting member;
   a lower horizontal rod having end caps;

a first vertical rod and a second vertical rod, wherein each vertical rod are configured to be attached to one end of the second horizontal rod and to one end of the lower horizontal rod; and two lower brackets.

7. The kit of claim 6, wherein the first and second vertical rods have a fixed length, and each lower bracket includes an elongated aperture.

8. The kit of claim 6, wherein the first and second vertical rods are telescopic.

9. The kit of claim 6, wherein the lower horizontal rod and the second horizontal rod are longer than the first horizontal rod.

10. The kit of claim 6, wherein the end caps of the first horizontal rod have a larger diameter than the end caps of the second horizontal rod.

11. A kit for a livestock feeding device, comprising:

a first horizontal rod and a second horizontal rod, each horizontal rod having end caps that are larger in diameter than a shaft of the rod;

at least two mounting brackets adapted to be affixed to an associated vertical surface, each mounting bracket comprising:

a U-shaped channel having an opening and adapted to receive both the first horizontal rod and the second horizontal rod;

a mounting member;

a connecting member joining the U-shaped channel and the mounting member together;

a stiffener plate underneath the connecting member joining the U-shaped channel and the mounting member; and a hay net through which the first and second horizontal rods are adapted to be strung.

12. The kit of claim 1, wherein the first and second horizontal rods are telescopic.

* * * * *